United States Patent [19]

Young

[11] 3,733,130

[45] May 15, 1973

[54] SLOTTED PROBE FOR SPECTROSCOPIC MEASUREMENTS

[75] Inventor: Jack P. Young, Oak Ridge, Tenn.

[73] Assignee: The United States of America as represented by the United States Atomic Energy Commission, Washington, D.C.

[22] Filed: Mar. 7, 1972

[21] Appl. No.: 232,488

[52] U.S. Cl. ............356/74, 250/218, 250/227, 350/96 R, 356/180, 356/181, 356/201, 356/244, 356/246

[51] Int. Cl. ............................G01j 3/42, G01j 3/50

[58] Field of Search....................250/218, 227; 350/96 R, 96 B; 356/181, 201, 244, 246, 180, 74

[56] References Cited

UNITED STATES PATENTS

| 3,068,742 | 12/1962 | Hicks et al. | 350/96 B X |
| 3,123,066 | 3/1964 | Brumley | 350/96 R |
| 3,164,663 | 1/1965 | Gale | 350/96 R |
| 3,470,261 | 9/1969 | Roberts | 250/218 X |
| 3,669,545 | 6/1972 | Gilby | 356/246 X |

Primary Examiner—Ronald L. Wibert
Assistant Examiner—F. L. Evans
Attorney—Roland A. Anderson

[57] ABSTRACT

A device is provided for conducting colorimetric or absorption spectral measurements which consists of a transparent material of proper index of refraction and having a geometrical design such that an entering beam of light into the material is totally reflected internally so as to proceed from an entering point into and through a sample system of known dimensions whereupon said beam emerges from said material through a single sealable opening and is transmitted to a conventional detector where spectral measurements are carried out in a normal manner.

2 Claims, 6 Drawing Figures

PATENTED MAY 15 1973 3,733,130

SLOTTED PROBE FOR SPECTROSCOPIC MEASUREMENTS

BACKGROUND OF THE INVENTION

This invention was made in the course of, or under, a contract with the United States Atomic Energy Commission.

Colorimetric and absorption spectral measurements are made daily in clinical, pathological, industrial, public health, university and government laboratories. The instruments vary in sophistication and are adapted to give readings with greater or lesser analytical accuracy, have specialized attachments for controlling the light beam, means for converting voltages to concentration of the sample and which, in general, require that the sample be placed into a cuvette which is then placed within the instrument.

In colorimetric and turbidimetric analysis, light from a prefocused bulb, collimated by an optical system, is passed through a liquid sample and is impinged upon a photocell. The resulting voltage is indicated on a precision meter calibrated to read directly in percent transmittance and optical density. Spectrophotometers enable the analyst to select a wavelength from the spectrum between ultraviolet to visible to near infrared by means of a diffraction grating monochrometer. Here, too, samples must be introduced into the instrument by means of cuvettes. Again, as in all photoelectric colorimeters, light is passed through the sample to a photocell whereupon the electrical output of said photocell is converted to a readout unit.

The greatest disadvantage of the above prior art method is the necessity of removing the sample from the process stream, placing it in a cuvette whereupon it is then placed within the measuring instrument. This handling step is particularly disadvantageous when the sample is extremely corrosive.

Recently a probe was developed which could be inserted into the sample for detection of organic functional groups most of which absorb at characteristic infrared wavelengths. Such a probe is described in *Chemical And Engineering News*, March 8, 1971, p. 53, and in *American Laboratory*, March 1971, p. 35. This probe makes use of attenuated total reflection (ATR) rather than transmission to obtain absorption information. The ATR effect is explained simply as follows: when a beam of radiation traveling in a crystal strikes a surface of the crystal, it will be totally internally reflected if the angle of incidence of the beam on the surface is greater than the critical angle. During the reflection process, the energy of the beam actually extends a certain distance outside of the crystal. When a liquid is brought in contact with the reflecting surface, this energy will be absorbed in the liquid at those wavelengths where the liquid absorbs. Absorption takes place at the reflecting surfaces wet by the sample. The amount of absorption that occurs is a function of the amount of surface wetted and of the concentration of the particular functional groups measured. Although this probe can be inserted into a process stream and thus can be utilized without the necessity for removing a process sample, as in the cuvette system, it is limited for use in the infrared region of the spectrum, and no transmission of a beam of radiation through a sample can be effected with this probe. Thus, there exists a need for an optical probe that can be inserted into a process stream, that is not limited to the infrared region of the spectrum, and that can be utilized for effecting transmission of a beam of radiation through a sample of the process stream for making analytical measurements. The present invention was conceived to meet this need in a manner to be described hereinbelow.

SUMMARY OF THE INVENTION

It is the object of the present invention to provide an optical measuring device which can be used for making colorimetric or absorption spectral measurements in a process stream or sample wherein transmission of beam energy through a sample as well as attenuated total reflection is utilized to obtain absorption information.

The above object has been accomplished in the present invention by utilizing an elongated, optical, slotted probe measuring device which is adapted to effect absorption spectral measurements while it is inserted into a process stream or sample. Using a transparent material and through the application of known geometrical design considerations, the probe is fabricated such that an entering beam of light is totally reflected internally whereupon the beam ultimately emerges near the entering point. The angle at which light enters the probe determines the degree of separation obtainable from the exiting beam and is adjustable. A slot is provided in the probe and is designed so that light enters at a point normal to the direction of the internal light beam. Light passes into and out of a sample system through the probe and only one sealable opening in the system. Further, this light beam passes across a known sample layer (i.e., that portion of the sample that fills the slot in the inserted probe) so that absorption spectral measurements can be carried out in the normal manner.

DESCRIPTION OF THE PREFERRED EMBODIMENTS

Figure 1:
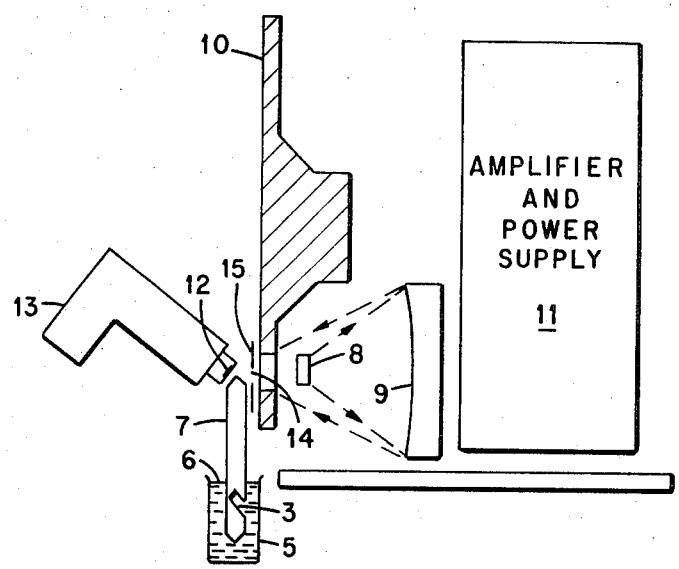
FIG. 1 is a schematic diagram illustrating a possible spectroscopic application of the present invention.

FIG. 1 illustrates one system in which a slotted probe may be utilized to effect absorption spectral measurements. An elongated, optical slotted probe 7 is inserted into a container 5 containing a sample 6 to be analyzed. The probe 7 is provided with a slot 3. The container 5 may contain a stationary sample, or it may be part of a conduit system in which the sample may be continuously moving process stream. In any event, the container 5 may be closed at its top about the probe 7 in a conventional manner when such is desired, especially when the sample 6 is highly corrosive or emits corrosive gases.

Figure 2:
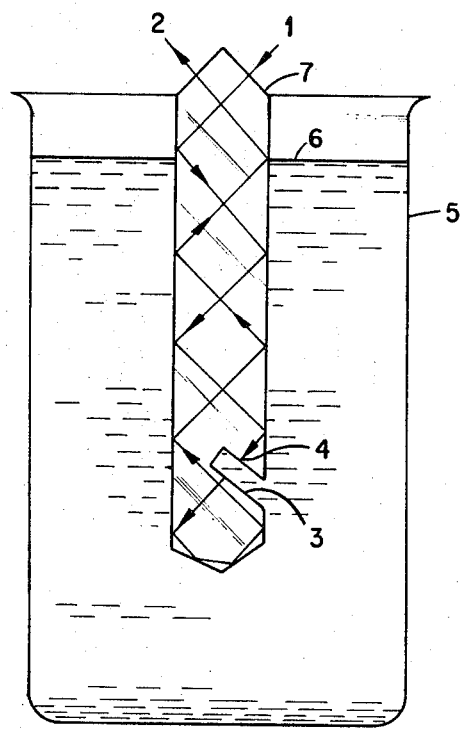
FIG. 2 is a cross-sectional view of one embodiment of a slotted probe.

In the system of FIG. 1, there is further provided a source of light radiation 8 which directs a beam of radiation onto a reflector 9 which in turn focuses a reflected beam of radiation through an opening in a filter wheel 10. The reflected beam of radiation is then directed through a slit 14 of a member 15 and then onto one face of the probe 7 as a beam 1 as more clearly illustrated in FIG. 2. The entering beam of light 1 is totally reflected internally within the probe 7 whereupon said beam ultimately emerges near where it enters, at the point 2. The probe 7 is made from transparent material and the angle at which light enters the probe determines the degree of separation obtainable from the exiting beam and is adjustable. Slot 3 is designed so that light enters at a point 4 normal to the direction of the internal light beam. As seen in FIG. 2, light passes into and out of a slotted probe 7 through only one opening in the container 5 which opening may be sealable about the probe 7, if such is desired or required. Further, this light beam passes across a known sample layer (i.e., that portion of the sample 6 that fills the slot 3) so that absorption spectral measurements can be carried out in the following conventional manner.

The exiting beam of light at point 2 of FIG. 2, impinges upon a detector 12 in FIG. 1. This detector 12 may be a photocell, for example. The output of the detector 12 is coupled to a preamplifier 13. Although not shown, the output of preamplifier 13 is coupled to an amplifier and power supply unit 11 in a conventional manner. The output of the amplifier unit 11 is connected to a conventional precision meter, not shown, which is calibrated to read directly in percent transmittance and optical density.

Figure 3:
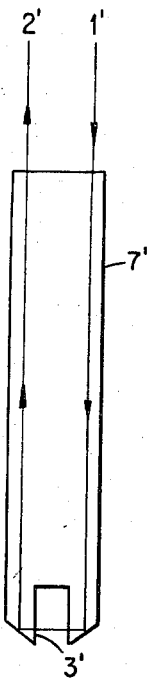
FIG. 3 is a cross-sectional view of another slotted probe.
Figure 4:
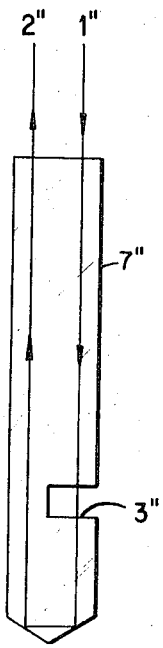
FIG. 4 is a cross-sectional view of still another slotted probe.

Two alternative designs of the slotted probe are illustrated in FIG. 3 and FIG. 4. In these embodiments, the probes are cylindrical in cross section with a prism-shaped bottom. Light enters at 1' or 1'', passes through slot 3' or 3'', and emerges at 2' or 2''. The probe in FIG. 3 has the slot 3' located in the apex of the prism-shaped bottom, a feature which would be of use where the quantity of sample material is limited. The embodiment in FIG. 4 has slot 3'' located in the side wall of the probe.

Figure 5A:
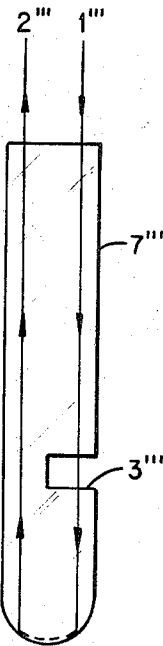
FIGS. 5A and 5B are cross-sectional views of another embodiment of the slotted probe.
Figure 5B:
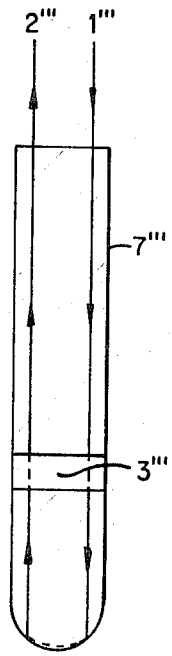

FIGS. 5A and 5B illustrate a further modification in which the probe is cylindrical with a hemispherical or conical-shaped bottom. Slot 3''' is, as before, a segment removed cross sectionally. The hemispherical or conical-shaped bottom permits a wide variety of materials to be used for the probe. Whereas the probes shown in FIGS. 2, 3, and 4 require an index of refraction of 0.5 more than the sample liquid, the FIG. 5 probe requires a probe material having an index of refraction of approximately 0.2 higher than the sample liquid.

Utilizing the embodiment shown in FIG. 5, either the probe or the light beam can be rotated through an arc of 90° whereby the light beam 1''' is passed through the slot 3''' and the sample therein as in FIG. 5A, or through the probe alone, FIG. 5B, to provide a blank reading for reference purposes.

All of the heretofore shown embodiments used separately or in combination will allow for easy insertion and sealing to the wall of liquid or gaseous process streams. The simple optical design of the above probes would make their manufacture relatively inexpensive. These characteristics are of special importance in processes requiring simple, easily replaceable, yet accurate, monitoring systems.

Much difficulty has been encountered in making analytical measurements in the extremely corrosive molten salt systems used in the Molten Salt Breeder Reactor. A practical solution to the problem would be use of a slotted probe made of $LaF_3$ with a 0.5–1.0 cm slot, in the manner of the present invention, to measure $BF_3OH^-$ ion in the molten $NaF-NaBF_4$ coolant stream of the above reactor. The light source would be a $SF_6$-HF laser and the detector would be a suitable IR detector, such as PBS, for example.

In addition to $LaF_3$, probes made of $SiO_2$ or $Al_2O_3$ should be useful for other special analytical applications in aqueous or organic systems and in the presence of numerous corrosive gases.

Additional advantages which accrue from use of a slotted spectroscopic probe are:

1. The slotted probe is not limited to the infrared region of the spectrum. The present invention can be used for all wavelengths of light transmittable through the probe material.
2. The slotted probe can provide a much larger and more controlled path-length for more sensitivity of measurement.
3. Colorimetric or turbidimetric measurements can be made in any amenable liquid or gaseous medium.
4. The above-described optical measuring device does not depend solely on attenuated total reflection thereby providing a greater degree of usefulness.
5. The system described hereinabove utilizes a simple, immersible, optical, slotted probe which is used not only for analytical measurements, but may also be used for control of both static and flowing process systems.

The present invention has been described by way of illustration rather than limitation and it should be apparent that it is equally applicable in fields other than those described.

What is claimed is:

1. A device for conducting colorimetric or absorption spectral measurements in a sample material comprising an immersible, optical, elongated probe adapted to be immersed in said sample material, said probe being provided with a side slot which receives therein a portion of said sample material, said probe being constructed in such a manner that a light beam entering one end thereof at a given angle is totally reflected internally from the walls and the end of said probe so as to proceed from said one end and through said probe and said sample material within said slot whereupon said beam emerges from said one end of said probe at a different angle from said entering light beam, said probe side slot being positioned at a desired slanted angle in said probe such that said reflected light beam enters said slot at a point normal to a side wall of said slot, and a detector positioned adjacent to said one probe end for receiving said emergent beam from said probe, said detector providing an output signal indicative of the degree of absorption of said light beam by said sample material within said probe slot.

2. The device set forth in claim 1, wherein said sample material is a process stream which flows through said probe slot.

* * * * *